United States Patent
Igaki et al.

(10) Patent No.: US 6,811,576 B2
(45) Date of Patent: Nov. 2, 2004

(54) SOLID ELECTROLYTIC CAPACITOR AND METHOD FOR MANUFACTURING THE SAME

(75) Inventors: Emiko Igaki, Amagasaki (JP); Seigo Shiraishi, Hirakata (JP); Masakazu Tanahashi, Osaka (JP); Sachiko Nobori, Kadoma (JP); Hisataka Katoh, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/340,405

(22) Filed: Jan. 10, 2003

(65) Prior Publication Data

US 2003/0137799 A1 Jul. 24, 2003

Related U.S. Application Data

(62) Division of application No. 09/697,583, filed on Oct. 26, 2000, now Pat. No. 6,552,896.

(30) Foreign Application Priority Data

Oct. 28, 1999 (JP) .......................................... 11-306672
Oct. 29, 1999 (JP) .......................................... 11-309281

(51) Int. Cl.[7] .................................................. H01G 9/00
(52) U.S. Cl. ..................................... 29/25.03; 361/523
(58) Field of Search ................. 29/25.03; 361/523–528, 361/535, 539

(56) References Cited

U.S. PATENT DOCUMENTS

| 4,542,195 A | 9/1985 | Shimizu et al. |
|---|---|---|
| 4,735,823 A | 4/1988 | Ito et al. |
| 4,764,263 A | 8/1988 | Gregory et al. |
| 4,785,380 A | 11/1988 | Harakawa et al. |
| 4,858,078 A | 8/1989 | Morimoto et al. |
| 5,153,820 A | 10/1992 | MacFarlane et al. |
| 5,454,147 A | 10/1995 | Kobayashi et al. |
| 5,470,525 A | 11/1995 | Tripp et al. |
| 5,621,608 A | 4/1997 | Arai et al. |
| 5,729,428 A | 3/1998 | Sakata et al. |
| 5,812,367 A | 9/1998 | Kudoh et al. |
| 5,897,974 A | 4/1999 | LaFleur |
| 5,917,693 A | * 6/1999 | Kono et al. |
| 6,156,690 A | 12/2000 | Hosaka |
| 6,166,242 A | 12/2000 | Appel et al. |

FOREIGN PATENT DOCUMENTS

| EP | 509 451 | 10/1992 |
|---|---|---|
| JP | 1-503425 | 11/1989 |
| JP | 2-260516 | 10/1990 |
| JP | 5-243096 | 9/1993 |
| JP | 6-196371 | 7/1994 |
| JP | 10247612 A | * 9/1998 |
| JP | 11045827 A | * 2/1999 |
| JP | 11-312627 | 9/1999 |
| WO | 88 08612 | 11/1988 |

* cited by examiner

*Primary Examiner*—Ha Tran Nguyen
(74) *Attorney, Agent, or Firm*—Merchant & Gould P.C.

(57) ABSTRACT

In the present invention, a capacitor element including a valve action metal, an oxide film layer formed on the surface of the valve action metal, and a solid electrolytic layer formed on the oxide film layer is provided with an organic compound having a boiling point of not lower than 150° C. and a melting point of not higher than 150° C., and the capacitor element including the organic compound is arranged inside a package. The oxide film is repaired with the organic compound as a solvent by an application of a dc voltage.

18 Claims, 5 Drawing Sheets

SOLID ELECTROLYTIC CAPACITOR AND METHOD FOR MANUFACTURING THE SAME

This application is a divisional of application Ser. No. 09/697,583, filed Oct. 26, 2000, now U.S. Pat No. 6,552,896 which application(s) are incorporated herein by reference.

BACKGROUND OF THE INVENTION

1. Field of the Invention

The present invention relates to a solid electrolytic capacitor including an anode made of a valve action metal such as aluminum, tantalum or niobium, and also including a solid electrolyte such as a conductive polymer or manganese dioxide. The present invention also relates to a method for manufacturing the solid electrolytic capacitor.

2. Description of the Prior Art

A typical solid electrolytic capacitor including a valve action metal for an anode is manufactured in the following manner. First, an anode is made of a porous compact of the valve action metal such as a surface-roughened aluminum foil or a porous compact of a sintered powder of a valve action metal such as tantalum or niobium. The entire surface of the porous compact of the valve action metal is covered with a dielectric oxide film. Secondly, a solid electrolytic layer of a conductive polymer such as polypyrrole or manganese dioxide is formed on the surface of the dielectric oxide film, and a cathodic layer of a carbon layer, a silver layer or the like is formed on the solid electrolytic layer. Subsequently, an anodic extraction terminal is attached to an anodic lead by welding or the like, and a cathodic extraction terminal is attached to a cathodic layer with a conductive adhesive or the like. Lastly, the entire element is covered with a packaging resin from which the cathodic extraction terminal and the anodic extraction terminal are partially exposed to the outside. Alternatively, the solid electrolytic layer can be connected electrically with the cathodic extraction terminal without forming a cathodic layer.

Since the packaging resin serves to maintain airtightness from the outside, it should be adhered securely to electrode extraction members such as a lead, a foil and a terminal. Especially, when the solid electrolyte is a conductive polymer, insufficient airtightness will cause considerable deterioration and thus, the electric properties will be difficult to maintain favorably for a long time. Therefore, for securing the airtightness, the packaging resin is formed generally from an epoxy-based thermosetting resin, using molding (a tip capacitor) or dipping (a lead capacitor).

A solid electrolytic capacitor having a case instead of a packaging resin is also known. Such a capacitor is manufactured by inserting an entire element in a case where a cathodic extraction terminal and an anodic extraction terminal are partially extracted outward, and by sealing the opening of the case with a resin or the like. The case is an insulator such as a resin or ceramic, or a metal having an insulated portion for a connection with terminal parts.

Generally, an electrolytic capacitor including an electrolytic solution can repair defects on a dielectric oxide film caused during a manufacturing process. Therefore, leakage current will not be increased considerably. However, a solid electrolytic capacitor including a solid electrolyte does not have sufficient capability to repair the dielectric oxide film. Such a dielectric oxide film cannot self-repair defects thereon. When the dielectric oxide film deteriorates due to stresses in manufacturing, such as mechanical stress and thermal stress, the leakage current tends to increase.

Conventionally, solid electrolytic capacitors are aged to decrease leakage current by applying a predetermined dc voltage to an interface between the anodic and cathodic terminals before or after formation of the package. In an aging, a film is repaired using water that has been absorbed from the atmosphere as an electrolytic solution. However, since this repair depends on moisture absorption, a conventional aging requires a long period to provide a stable leakage current property.

JP-A-5-243096 discloses a method to insulate a conductive polymer used for a solid electrolyte with Joule heat by concentrating a current on a part with lowered voltage resistance. However, when the defect is large, the insulation may be insufficient and the leakage current cannot be decreased.

SUMMARY OF THE INVENTION

A purpose of the present invention is to provide a solid electrolytic capacitor capable of decreasing a leakage current with a further efficiency when compared with a capacitor aged under an influence of moisture absorption, and also to provide a method for manufacturing the capacitor.

A solid electrolytic capacitor of the present invention includes a capacitor element inside a packaging material. The capacitor element includes a valve action metal, an oxide film layer formed on a surface of the valve action metal, a solid electrolytic layer formed on the oxide film layer, and contains an organic compound having a boiling point of not lower than 150° C. and a melting point of not higher than 150° C.

A method for manufacturing a solid electrolytic capacitor of the present invention includes a step of providing a capacitor element with an organic compound having a boiling point of not lower than 150° C. and a melting point of not higher than 150° C., and arranging the capacitor element containing the organic compound inside a package.

Accordingly, because of the organic compound, a solid electrolytic capacitor can be aged more efficiently when compared to a conventional method, and a solid electrolytic capacitor with less leakage current can be provided easily.

DETAILED DESCRIPTION OF THE INVENTION

Figure 1:
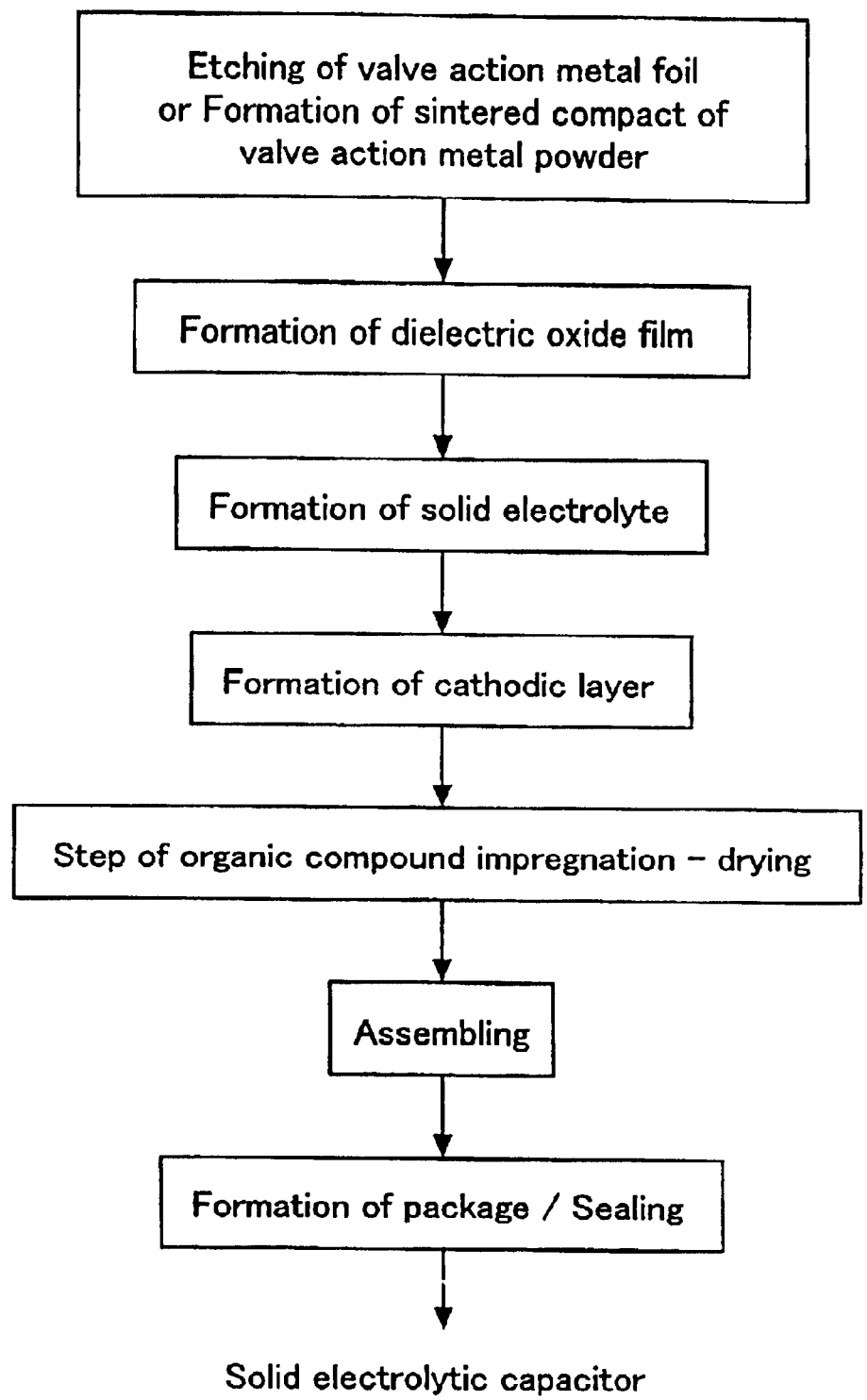
FIG. 1 is a flow diagram to illustrate a method for manufacturing a solid electrolytic capacitor according to the present invention.

The following explanation is about preferable embodiments in the present invention.

Since an organic compound included in a capacitor element has a boiling point of not lower than 150° C., the compound is difficult to vaporize even if it is heated during manufacture of the solid electrolytic capacitor. In a process of manufacturing a solid electrolytic capacitor, fixation of the capacitor element to an extraction terminal or formation of a cathodic layer often is carried out with heating to at least about 150° C. Therefore, when the organic compound has a boiling point of lower than 150° C., the organic compound cannot be maintained securely after impregnation, and it may vaporize to cause failure in forming the cathodic layer etc. or in bonding to the extraction terminal. This vaporization will lower the electric properties of the capacitor.

It is further preferable that the organic compound has a boiling point of not lower than 200° C., since the capacitor element will be heated at about 150° C. to 200° C. for thermosetting when a resin is formed to be a package through a transfer molding or dipping.

It is especially preferable that the organic compound has a boiling point of not lower than 250° C., since the capacitor is heated at about 230° C. to 250° C. when a tip-type solid electrolytic capacitor is mounted on a substrate by soldering. However, the boiling point of an organic compound used for a soldering capacitor is not always required to be equal to or higher than 250° C., since the organic compound will not vaporize rapidly even if it has a boiling point of lower than 250° C., depending on the conditions relating to the mounting methods and heating period.

As the organic compound has a melting point of not higher than 150° C., it will be present as a liquid or a solid that can be liquefied quickly in part by Joule heat provided by leakage current at a defect on the oxide film during a voltage application. Ions are eluted from a solid electrolytic layer through the liquid of the organic compound as a solvent (organic solvent), and thus, an electrolytic solution is formed. In this way, the capacitor element is provided with self-repairing capacity. As a result, an oxide film damaged during a manufacturing process can be repaired easily with an aging voltage, and an oxide film damaged during a packaging step or during use can be self-repaired with a voltage during a use.

Preferably the organic compound is a solid at a room temperature of 25° C. Such an organic compound will leak out of a package less, and it has an excellent retention. Preferably the organic compound has a melting point higher than 25° C. so that it keeps a solid state at a room temperature. It is more preferable that the melting point is higher than 40° C., since it can be present as a solid in an ordinary temperature range (40° C. or lower) for using an electronic product including the solid electrolytic capacitor. When a resin is used for the package, it is preferable that the organic compound is prevented from penetrating from the inside of the capacitor element and encroaching into the resin. An organic compound having a melting point of higher than 60° C. can be used preferably when the temperature range for use is set to be even higher.

When the organic solvent is provided with excessive ions, large current may flow in the defects on the oxide film during a voltage application, and this may cause damage on the film. Therefore, the organic compound is preferably made of a substance having ions that will not substantially be dissociated, or a substance with a low dissociation constant.

An organic compound for providing such an organic solvent can be selected from a group consisting of alcohols, phenols, esters, ethers and ketones, though there is no specific limitation. In this description, technical terms regarding to the substances ranging from alcohols to ketones are used in a wide sense. For example, the term 'phenol' includes various phenol derivatives where hydrogen(s) of a benzene ring is substituted with a hydroxyl group. These compounds generally provide organic solvents to make electrolytic solutions having appropriate electroconductivity due to ions eluted from solid electrolytes.

Organic acids also can be used for the organic compounds when the dissociation constant is not so high. A preferable example of the organic acids includes a fatty acid. The organic acid preferably has a dissociation constant of at least 4.5 when indicated by pKa at 25° C., since appropriate dissociation will provide electroconductivity suitable for repairing.

Another example of a preferable organic compound is an amine. In this specification, 'amine' includes aliphatic amines, aromatic amines, and also includes primary to tertiary amines. Amines have a function to coordinate with hydrogen ions in the organic solvent and lower the concentration of the hydrogen ions. Accordingly, damage of the oxide film, which is caused by a strong acid, can be controlled. In a case where aluminum is used for a valve action metal, the oxide film will be damaged considerably when the hydrogen ion concentration is raised. This damage can be controlled by using an amine.

When repairing an oxide film, hydrogen ions are reduced in general due to a reaction accompanied by the repair, and hydrogen gas is generated. For actively controlling generation of hydrogen gas, it is preferable that the capacitor element further contains a substance having a reduction potential higher than a hydrogen-generating potential, namely, an oxidizer that will be reduced more easily than hydrogen. The substance is reduced prior to hydrogen so as to control generation of a hydrogen gas.

Substances having reduction potentials higher than that in hydrogen generation include perchloric acids and their salts, permanganic acids and their salts, chromic acids and their salts, peroxodisulfuric acids and their salts, and a compound including a nitro group. When a conductive polymer is used for a solid electrolyte, it is preferable to select a substance that does not oxidize-decompose the conductive polymer. From this point of view, a compound including a nitro group is the most preferable. Based on the above-mentioned reason, the substance preferably has a boiling point of not lower than 150° C.

Generated hydrogen gas increases the inner pressure of the capacitor. The gas pressure is raised especially in an interface between a solid electrolytic layer and a dielectric oxide film. When the inner pressure is raised excessively, the solid electrolytic layer may be peeled off from the dielectric oxide film. When the solid electrolytic layer is peeled off, a new problem will occur: capacitance of the capacitor will be lowered. In a conventional aging to repair an oxide film by using absorbed water, the generation of hydrogen gas due to reduction of hydrogen ions is inevitable. According to the preferable embodiment of the present invention, however, an oxide film can be repaired while controlling generation of hydrogen gas.

The above-mentioned substance that can control generation of hydrogen gas is effective also in maintaining capacitance during a re-formation process to provide a solid electrolytic capacitor. Since re-formation is carried out in a solvent such as water or an alcohol, hydrogen gas generated due to reduction of hydrogen ions may be a problem similar to that in the above-mentioned process. It is preferable for obtaining a stable leakage current property that re-formation is carried out in each of several steps separately performed for forming a solid electrolytic layer. Though the re-formation steps can lower the capacitance, peeling of the solid electrolytic layer can be controlled by including in the solid electrolyte a substance having a reduction potential equal to or higher than the potential relating to hydrogen generation.

Namely, a preferable embodiment of the present invention further includes a step of repairing defects on an oxide film layer by applying a dc voltage in a state that the solvent is contacted with either a solid electrolytic layer or a solid electrolyte composing a part of the solid electrolytic layer before a capacitor element is arranged inside a package, in which the solid electrolytic layer contains a substance having a reduction potential equal to or higher than the potential relating to hydrogen generation. An organic solvent such as water or an alcohol, or a mixture thereof can be used as a solvent for the electrolytic solution. A solid electrolytic layer can be formed by alternately repeating a step of forming a part of a solid electrolytic layer and the above-described step of repairing defects on the oxide film layer.

Generation of hydrogen gas accompanying the repair of an oxide film will be explained below with reference to FIG. 5.

Figure 5A:
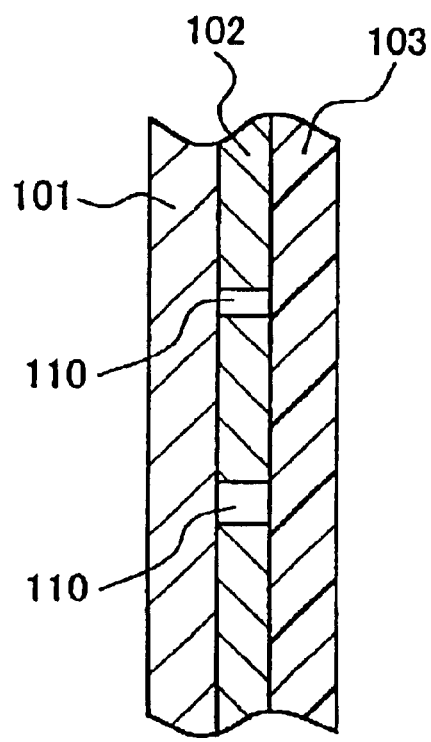
FIG. 5 is a cross-sectional view to illustrate peeling in a solid electrolytic film, which might occur as a result of repair of an oxide film.
Figure 5B:
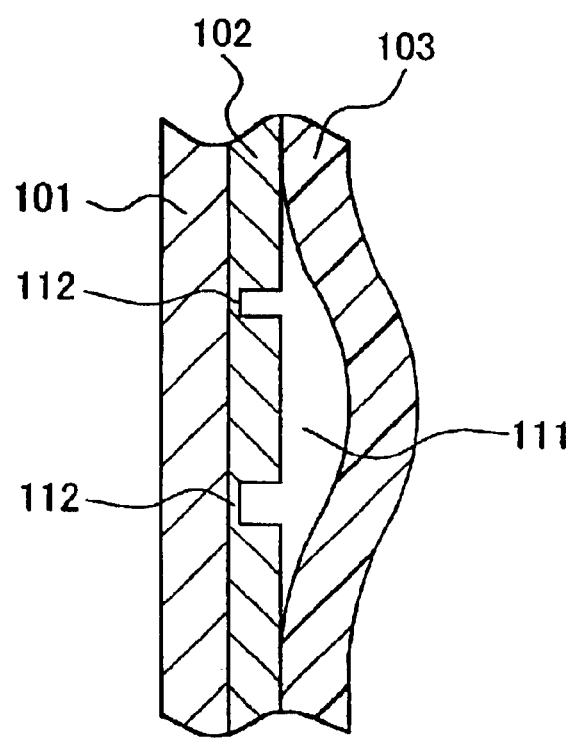

When voltage is applied to repair defective parts 110 of an oxide film 102, the following reaction (1) proceeds at a portion of the defective part 110 in the vicinity of a valve action metal 101 (anode side) while the following reaction (2) proceeds at a portion of the defective parts 110 in the vicinity of the solid electrolyte layer 103 (cathode side) (FIG. 5(A)). As a result, repaired parts 112 are provided to the oxide film by the reaction (1), while a peeling 111 of the solid electrolytic layer may occur due to the pressure of hydrogen gas generated by the reaction (2) (FIG. 5(B)). Though the following reaction formulas relate to a case where tantalum is used for the valve action metal, similar reactions will occur if any other valve action metals are used.

$$2Ta + 10OH^- \rightarrow Ta_2O_5 + 5H_2O + 10e^- \quad (1)$$

$$10H^+ + 10e^- \rightarrow 5H_2\uparrow \quad (2)$$

For preventing the solid electrolytic layer from peeling off, a substance added together with the organic compound is preferably a substance not releasing a gas (i.e., not gasified) when being reduced, while it controls the reaction (2).

The organic compound can be a substance having per se a reduction potential equal to or higher than the potential relating to hydrogen generation. The substances include, for example, 3-nitroanisole (melting point: 54° C., boiling point: 260° C.), which is a compound containing a nitro group.

To provide self-repair capacity to a solid electrolytic capacitor by using an organic compound, consideration should be given to providing the organic compound to the interior of a capacitor element and also to maintaining the organic compound not to be lost during the manufacturing process. In a conventional method, various organic compounds are added as polymerization accelerators when a conductive polymer is used for a solid electrolytic layer. However, since the conductive polymer layer is washed after its formation process, hardly any of the added organic compound remains after the polymerized conductive polymer is washed. Therefore, it is preferable that the organic compound is impregnated after a step of washing the solid electrolytic layer, or that a washing solution in which the organic compound is difficult to dissolve should be selected so that the organic compound will not be washed out even if the organic compound is impregnated before the washing step. As a result, the capacitor element containing the organic compound can be housed in a case or covered with a packaging resin.

For an efficient repair, preferably the organic compound is impregnated deep into the pores of the capacitor element. The following method is especially preferable for deeply impregnating an organic compound that is solid at a room temperature.

An example of the above-mentioned methods includes a step of impregnating a solution of an organic compound dissolved in a solvent into a capacitor element, and a step of applying heat for evaporating the solvent. A solvent preferably used here is an organic solvent having a boiling point of not higher than 100° C., for example, lower alcohols such as ethanol and isopropyl alcohol.

In a second example regarding the above-mentioned method, an organic compound is heated to generate a vapor to be impregnated into a capacitor element.

In a third example regarding the above-mentioned method, an organic compound liquefied by heat is impregnated into a capacitor element.

In a fourth example regarding the above-mentioned method, an organic compound that is heated previously to lower its viscosity is impregnated into a capacitor element.

The above-mentioned methods can be carried out at any of the stages between forming a solid electrolytic layer and arranging the capacitor element inside a package.

In a fifth example regarding the above-mentioned method, an organic compound is added to a solution for forming a solid electrolytic layer in order to impregnate this organic compound into a capacitor element.

A method can be selected from the above-mentioned ones appropriately corresponding to some factors such as variation of the organic compounds. From a viewpoint of access to the deep parts of the pores, the solution of an organic compound dissolved in a solvent is impregnated preferably before removing the organic compound by evaporation, or the solution is included preferably at a step of forming a solid electrolytic layer. From a viewpoint of raising the impregnation concentration for an improved effect, methods relating to evaporation and liquefaction can be used advantageously.

The thus impregnated organic compound is used to repair defects of an oxide film. In other words, a dc voltage is applied to carry out a further step of repairing defects of an oxide film that the liquefied organic compound contacts. When the organic compound is solid during the aging treatment, it is preferable that the organic compound is liquefied by the heat generated due to the current concentrated on the defects during an application of the dc voltage, and also the defects of the oxide layer are repaired by the applied dc voltage.

Since re-formation can be carried out during a step of forming a solid electrolytic layer, influence of washing can be ignored. A substance having a reduction potential equal to or higher than the potential relating to hydrogen generation can be included in the solid electrolytic layer by, for example, adding the same substance to a solution prepared for forming the solid electrolytic layer. Alternatively, this substance can be included in a solid electrolytic layer by contacting a solution containing this substance with either a solid electrolytic layer or a solid electrolyte composing a part of the solid electrolytic layer.

Preferably, the substance having a reduction potential equal to or higher than the potential relating to hydrogen generation is contained in the solid electrolytic layer within a range from 50 ppm to 10 wt %. If the concentration is extremely low, a sufficient effect may not be obtained in lowering the capacitance. If the concentration is extremely high, electroconductivity of the conductive polymer may be lowered. Since the solid electrolytic layer is washed after re-formation, the concentration value measured for a solid electrolytic capacitor as a final product can be lower than the same value measured during the re-formation.

Figure 3:
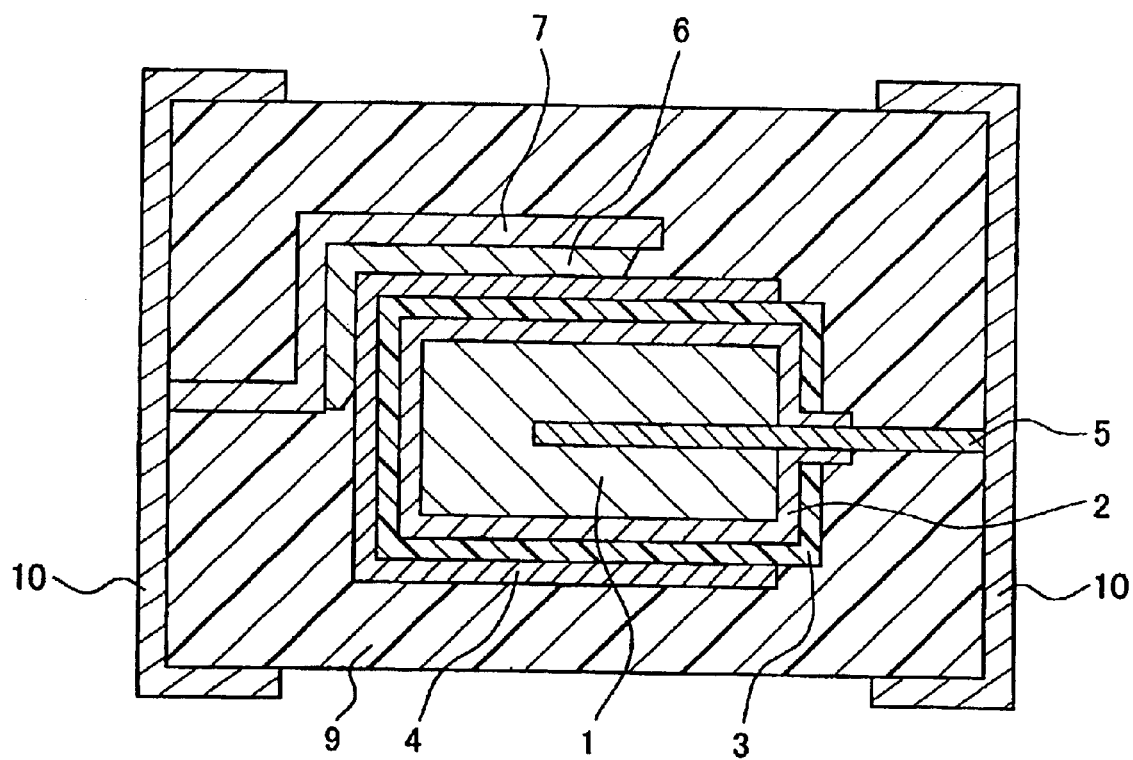
FIG. 3 is a cross-sectional view to illustrate another solid electrolytic capacitor according to the present invention.
Figure 4:
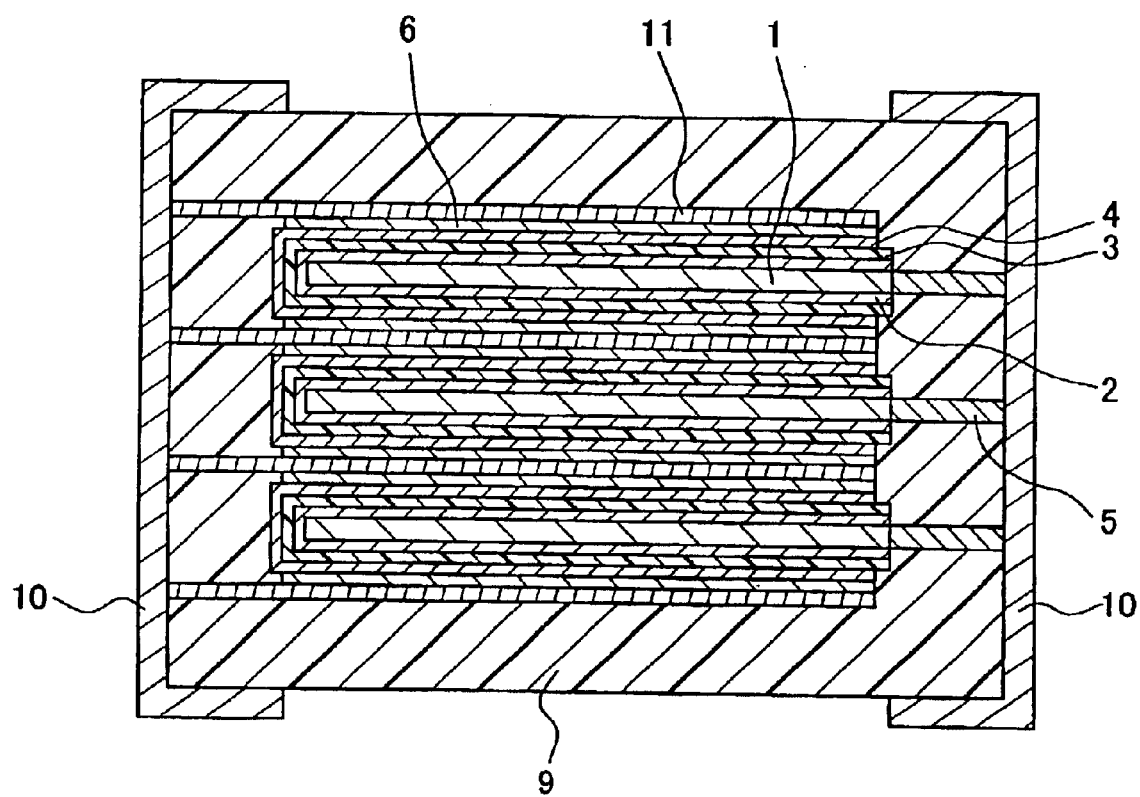
FIG. 4 is a cross-sectional view to illustrate still another solid electrolytic capacitor according to the present invention.

In the following, solid electrolytic capacitors and methods of manufacturing the same according to the present invention will be explained with a reference to FIGS. 2–4.

Figure 2:
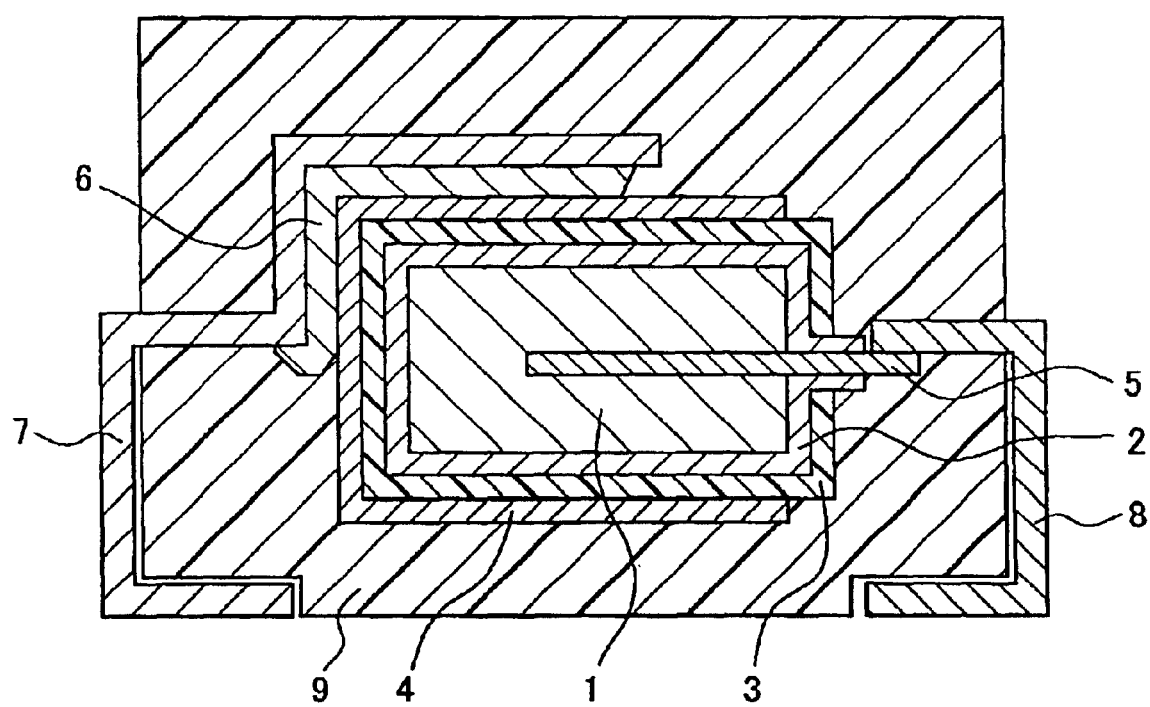
FIG. 2 is a cross-sectional view to illustrate a solid electrolytic capacitor according to the present invention.

In a solid electrolytic capacitor shown in FIG. 2, a capacitor element is covered with a packaging resin 9. Regarding this solid electrolytic capacitor, the capacitor element is composed of an anode 1 made of a valve action metal, a dielectric oxide film 2 formed on the surface of the valve action metal, a solid electrolytic layer 3 formed on the dielectric oxide film, and a cathodic layer 4 formed on the solid electrolytic layer.

The capacitor element is covered as a whole with a packaging resin 9, excepting where a cathodic extraction terminal 7 and an anodic extraction terminal 8 are extracted through the packaging resin 9 outward to secure its electroconductivity. The anodic extraction terminal 8 is connected with the anode 1 via an anodic lead 5. The cathodic extraction terminal 7 is connected with the cathodic layer 4 via a conductive adhesive 6 or the like.

A solid electrolytic capacitor to which the present invention is applicable will not be limited to the embodiment shown in FIG. 2. Alternatively, an anodic extraction terminal can be omitted. In this case, a pair of external terminals 10 can be arranged to be respectively connected to an anodic lead 5 and to a cathodic extraction terminal 7 that are exposed to the surface of the package 9 as shown in FIG. 3. Alternatively, the cathodic extraction terminal also can be omitted, and a cathodic foil 11 that is stuck to a cathodic layer 4 with a conductive adhesive 6 etc. is exposed to the surface of the package 9, and a pair of external terminals 10 are connected to this cathodic foil 11 and to an anodic lead 5 respectively. See FIG. 4. In such a configuration, formation of the cathodic layer 4 and the conductive adhesive 6 can be omitted. Or, similar to a conventional electrolytic capacitor of an electrolytic solution type, a solid electrolyte can be filled instead of an electrolytic solution in a roll of a laminate composed of an anodic foil, a cathodic foil and a separator, though this is omitted from the drawings. In this case, respective leads attached to the anodic foil and the cathodic foil are extracted from the package to make terminals.

The respective members are further explained in the following.

The anode 1 is made of a valve action metal. Preferably, aluminum, tantalum or niobium can be used for the valve action metal. Though omitted from the drawings, the anode is a porous compact provided with numbers of micro-holes or pores communicating with the outer surface.

When aluminum is used for the anode, an aluminum foil can be roughened by etching or the like to be provided with numbers of micropores. When tantalum or niobium is used, a porous compact can be prepared by press-molding a powder of the valve action metal before sintering. Or the valve action metal powder can be applied to form a sheet and sintered to provide a porous compact. These porous compact foils can be rolled or laminated for use.

The dielectric oxide film layer 2 can be formed by anodizing the surface of a porous compact of a valve action metal. Though this also is omitted from the drawings, the dielectric oxide film layer is formed in general on the entire surface of the valve action metal and also on the surface of the micro-pores provided to the porous compact, excepting a part of the anodic lead 5 for connecting with the anodic extraction terminal.

The solid electrolytic layer 3 can be formed from manganese dioxide or a conductive polymer material. This layer is formed also inside the micro-holes of the porous compact, though this also is omitted from the drawings. Conductive polymers such as polypyrrole, polyaniline, and polythiophene can be used preferably for the solid electrolyte, but there is no specific limitation.

The cathodic layer 4 can be made of a carbon layer, a silver layer or the like, for collecting electric capacity extracted by the solid electrolytic layer. The cathodic layer is formed on the foil surface when the valve action metal porous compact as an anode is composed of a foil. However, when the porous compact is a roll or a laminate of foils, the cathodic layer can be formed on the outer surface of the entire porous compact. When the porous compact is composed of a sintered powder, the cathodic layer will be formed on the outer surface. The cathodic layer is not an essential element. Depending on the structure and materials, the solid electrolytic layer 3 can be bonded directly to the cathodic extraction terminal 7.

The cathodic extraction terminal 7 is bonded to the cathodic layer 4 in general with a conductive adhesive layer 6 like a silver-based adhesive. When the cathodic extraction terminal 7 is bonded directly to the solid electrolytic layer 3, the conductive adhesive layer 6 also can be omitted.

The anodic extraction terminal 8 is bonded to the anodic lead 5 inserted into the anode by welding or the like.

The package 9 is formed to cover the entire element excepting parts where the cathodic extraction terminal 7 and the anodic extraction terminal 8 pass through. The package can be a case of ceramic, resin or metal. In the embodiment shown in the drawings, a packaging resin is used. Preferably the packaging resin is formed by molding or dipping. The resin can be, for example, an epoxy-based resin.

FIG. 1 is a flow diagram to illustrate an example of a method to manufacture a solid electrolytic capacitor according to the present invention.

First, an anode is formed by etching a valve action metal foil or by forming a sintered compact of a valve action metal powder. Next, a dielectric oxide film is formed on the surface of the anode, and a solid electrolytic layer is formed on the oxide film. Subsequently, a cathodic layer is formed if necessary. These steps can be carried out in accordance with a conventional technique.

In the steps illustrated in FIG. 1, an organic compound is impregnated into a capacitor element by the above-mentioned method after formation of a cathodic layer. However, impregnation of the organic compound can be carried out at any stage between formation of the solid electrolytic layer and either formation or sealing of the package. Or an organic compound can be impregnated by adding the organic compound to a solution used for forming the solid electrolytic layer. As mentioned above, a substance having a potential equal to or higher than the potential relating to hydrogen generation can be added at the same time to this solution.

The substance having a reduction potential equal to or higher than the potential relating to hydrogen generation can be included in the solid electrolytic layer by contacting a solution including this substance with either a solid electrolytic layer or a solid electrolyte composing a part of the solid electrolytic layer. As mentioned above, this substance will control peeling of the solid electrolytic layer during the re-formation.

Bonding to the cathodic extraction lead and the anodic extraction lead is carried out in a subsequent assembling step. A capacitor element is finally arranged inside the package by inserting and sealing in the packaging case, or as a result of a formation of a packaging resin. If necessary, the terminal parts that are not covered with the package will be folded in a certain direction.

Thus obtained solid electrolytic capacitor includes a capacitor element having an organic compound inside thereof. The oxide film has self-repairing capacity since ions will be eluted from the solid electrolyte into this organic compound, or specifically, into an organic solvent of a liquefied organic compound existing inside of the solid electrolyte and also in the interface between the dielectric oxide film and the solid electrolyte. A solid electrolytic capacitor with less leakage current can be provided efficiently due to this self-repairing capacity.

The organic compound is not required to be liquefied as a whole. It should be liquefied at a part where leakage current flows by Joule heat generated due to the leakage current so as to serve as a solvent.

When a conductive polymer is used as a solid electrolyte, the organic compound impregnated into the solid electrolytic layer can drain dopant in the conductive polymer out (de-doping) easily at defective parts in the dielectric oxide film. The resistance value of the conductive polymer will be raised when the de-doping occurs. Leakage current also can be decreased by such a secondary effect.

The present invention will be further described below by referring to some examples, though the examples are not intended to restrict the present invention.

COMPARATIVE EXAMPLE

First, for a comparison, a solid electrolytic capacitor was manufactured without impregnating an organic compound.

A tantalum powder was molded with a lead and sintered to form a valve action metal porous compact of 1.4 mm×3.0 mm×3.8 mm. Next, the whole surface of the porous compact including pores surface was anodized excepting lead tips with a formation voltage of 20V in an aqueous solution of phosphoric acid so as to form a dielectric oxide film layer. Subsequently, a solid electrolytic layer of polypyrrole was formed by a chemical oxidative polymerization of a pyrrole monomer on the surface of the dielectric oxide film layer including the inner surface of the pores.

A carbon layer and a silver layer were laminated on the solid electrolytic layer applied to the outer surface of the porous compact. These layers serve as cathodic layers. Then, a cathodic extraction terminal is adhered with a silver-based adhesive (a conductive adhesive) to the cathodic layer, while an anodic extraction terminal is bonded by welding to a lead of the porous compact of the valve action metal as an anode. Further, a package was formed by transfermolding of an epoxy-based resin. Exposed portions of the cathodic extraction terminal and the anodic extraction terminals were folded so that a solid electrolytic capacitor having a cross section similar to that of FIG. 2 was obtained.

Example 1

A solid electrolytic capacitor was obtained in the same way as the Comparative Example except that an alcohol was impregnated into a capacitor element in a stage where a cathodic layer was formed. The alcohol was glycerol having a melting point of 17° C. and a boiling point of 290° C. In the impregnation, the capacitor element was dipped in a solution of isopropyl alcohol in which 20 weight % of glycerol was dissolved. After being taken out from the solution, the element was heated at 120° C. to evaporate the isopropyl alcohol.

Example 2

A solid electrolytic capacitor was obtained in the same way as the Comparative Example except that an alcohol was impregnated into a capacitor element in a stage where a cathodic layer was formed. The alcohol was glycerol having a melting point of 17° C. and a boiling point of 290° C. In the impregnation, two small containers including respectively a capacitor element and glycerol were disposed in a sealed container. The glycerol was heated at 100° C. to generate a vapor, and the capacitor element was exposed to the vapor.

Example 3

A solid electrolytic capacitor was obtained in the same way as the Comparative Example except that an alcohol was impregnated into a capacitor element in a stage where a cathodic layer was formed. The alcohol was stearyl alcohol having a melting point of 59° C. and a boiling point of 210° C. In the impregnation, the capacitor element was dipped in a solution of ethanol in which 3 weight % of stearyl alcohol was dissolved. After being taken out from the solution, the element was heated at 100° C. to evaporate the ethanol.

Example 4

A solid electrolytic capacitor was obtained in the same way as the Comparative Example except that an alcohol was impregnated into a capacitor element in a stage where a conductive polymer layer was formed. The alcohol was stearyl alcohol having a melting point of 59° C. and a boiling point of 210° C. In the impregnation, the capacitor element was dipped in a solution of ethanol in which 3 weight % of stearyl alcohol was dissolved. After being taken out from the solution, the element was heated at 100° C. to evaporate the ethanol.

Example 5

A solid electrolytic capacitor was obtained in the same way as the Comparative Example except that a phenol (a phenol derivative) was impregnated into a capacitor element in a stage where a cathodic layer was formed. The phenol was 2,3-xylenol having a melting point of 73° C. and a boiling point of 218° C. In the impregnation, the capacitor element was dipped in a solution of ethanol in which 10 weight % of xylenol was dissolved. After being taken out from the solution, the element was heated at 100° C. to evaporate the ethanol.

Example 6

A solid electrolytic capacitor was obtained in the same way as the Comparative Example except that a phenol (a phenol derivative) was impregnated during a step of forming a conductive polymer layer. The phenol was 2,3-xylenol having a melting point of 73° C. and a boiling point of 218° C. In the impregnation, a chemical oxidative polymerization was carried out by using a solution in which xylenol was dissolved. Specifically, a conductive polymer was formed by a chemical oxidative polymerization in which a pyrrole monomer solution (a mixture of water/ethanol in which pyrrole is dissolved) including 10 weight % of xylenol and a solution of an oxidant (a mixture of water/ethanol in which iron sulfide (III) is dissolved) including 10 weight % of xylenol were prepared and the capacitor was dipped alternately in these two solutions. In a washing step following the formation of the conductive polymer layer, water was used for the washing solution since solubility of xylenol thereto is low. As a result, xylenol was included in the capacitor element at the same time the conductive polymer layer was formed.

Example 7

A solid electrolytic capacitor was obtained in the same way as the Comparative Example except that an ester was impregnated into a capacitor element in a stage where a cathodic layer was formed. The ester was butyl benzoate having a melting point of −22° C. and a boiling point of 250° C. In the impregnation, a solution with a low viscosity was prepared by heating the butyl benzoate at 100° C., and a capacitor element was dipped in this solution.

Example 8

A solid electrolytic capacitor was obtained in the same way as the Comparative Example except that an ether was impregnated into a capacitor element in a stage where a solid electrolytic layer was formed. The ether was diphenyl ether having a melting point of 28° C. and a boiling point of 259° C. In the impregnation, the capacitor element was dipped in a solution of ethanol in which 5 weight % of diphenyl ether was dissolved. After being taken out from the solution, the element was heated at 100° C. to evaporate the ethanol.

Example 9

A solid electrolytic capacitor was obtained in the same way as the Comparative Example except that a ketone was impregnated into a capacitor element in a stage where a solid electrolytic layer was formed. The ketone was phorone having a melting point of 28° C. and a boiling point of 199° C. In the impregnation, the capacitor element was dipped in a solution of ethanol in which 5 weight % of phorone was dissolved. After being taken out from the solution, the element was heated at 100° C. to evaporate the ethanol.

Example 10

A solid electrolytic capacitor was obtained in the same way as the Comparative Example except that a fatty acid was impregnated into a capacitor element in a stage where a cathodic layer was formed. The fatty acid was stearic acid (pKa>4.6) having a melting point of 71° C. and a boiling point of 360° C. In the impregnation, the capacitor element was dipped in a solution obtained by melting the stearic acid with heat at 100° C.

Example 11

A solid electrolytic capacitor was obtained in the same way as the Comparative Example except that an amine was impregnated into a capacitor element in a stage where a cathodic layer was formed. The amine was triethanolamine having a melting point of 21° C. and a boiling point of 360° C. In the impregnation, the capacitor element was dipped in a solution of ethanol in which 5 weight % of triethanolamine was dissolved. After being taken out from the solution, the element was heated at 100° C. to evaporate the ethanol.

Example 12

A solid electrolytic capacitor was obtained in the same way as the Comparative Example except that an amine was impregnated into a capacitor element in a stage where a cathodic layer was formed. The amine was diphenylamine having a melting point of 53° C. and a boiling point of 310° C. In the impregnation, the capacitor element was dipped in a solution obtained by heating the diphenylamine at 100° C.

Example 13

A solid electrolytic capacitor was obtained in the same way as the Example 1 except that a nitro group containing compound was impregnated into a capacitor element in a stage where a solid electrolytic layer was formed. The nitro group containing compound was 4-nitrophthalic acid having a melting point of 165° C. This capacitor element contains glycerol and nitrophthalic acid. For impregnating nitrophthalic acid, a capacitor element was dipped in a solution as a mixture of water/ethanol including 2 weight % of 4-nitrophthalic acid. After being taken out from the solution, the element was heated at 100° C. to evaporate water/ethanol.

Example 14

A solid electrolytic capacitor was obtained in the same way as the Example 1 except that a nitro group containing compound was impregnated into a capacitor element during a step of forming a conductive polymer layer. The nitro group containing compound was 3-nitroanisole having a melting point of 54° C. and a boiling point of 260° C. This capacitor element contains glycerol and nitroanisole. For impregnating nitroanisole, a chemical oxidative polymerization was carried out using a solution in which nitroanisole was dissolved. Specifically, a conductive polymer layer of polypyrrole containing nitroanisole was formed by a chemical oxidative polymerization in which a monomer solution including 1 weight % of 3-nitroanisole and a solution of an oxidant (a mixture of water/ethanol in which iron sulfide (III) is dissolved) including 1 weight % of 3-nitroanisole were prepared and the capacitor was dipped alternately in these two solutions. In a washing step following formation of the conductive polymer layer, water was used for the washing solution since the solubility of nitroanisole thereto is low.

Example 15

A solid electrolytic capacitor was obtained in the same way as the Comparative Example except that a nitro group containing compound was impregnated into a capacitor element in a stage where a solid electrolytic layer was formed. The nitro group containing compound was 3-nitroanisole having a melting point of 54° C. and a boiling point of 260° C. In the impregnation, the capacitor element was dipped in a solution of ethanol in which 3 weight % of 3-nitroanisole was dissolved. After being taken out from the solution, the element was heated at 100° C. to evaporate the ethanol.

A solid electrolytic capacitor rated at 6.3V and with a standard value of 150 $\mu$F was obtained in any of the above-mentioned Comparative Example and Examples 1–15.

These solid electrolytic capacitors were aged for one hour by applying a voltage of 10V at a room temperature. Respectively 100 capacitors were aged for the Examples and Comparative Example.

For the capacitors in the Comparative Example, the leakage current was as large as 20 $\mu$A to 100 $\mu$A, and the values were not lowered to an applicable range. On the other hand, the leakage current for the capacitors in the Examples was lowered to 5 $\mu$A or less as a result of aging for several minutes, and the leakage current was controlled successfully to a practical level.

To control the leakage current of a capacitor in the Comparative Example within a practical range, aging should be carried out by a moisture absorption at a temperature of 85° C. and at a relative humidity of 85%, which was immediately followed by application of voltage 10V at the above-mentioned temperature. Though this method could control leakage current to be 5 $\mu$A or less, the time for the aging, including times for moisture absorption, stretched over a period of ten or more hours. Since such a capacitor includes amounts of water, the package had cracks due to the water vaporizing rapidly by the heat at a solder-mounting. To prevent this problem, a drying step should be carried out after the aging. As a result, the entire aging process was further prolonged. After a drying step for 40 hours at 120° C., the leakage current was about 10 $\mu$A on average. The leakage current was increased after the drying step. An applicable explanation for this is that the oxide film was damaged again because of thermal stress applied during the drying step.

One hundred aged capacitors were prepared for every Example (for the Comparative Example, capacitors were aged and re-dried after a moisture absorption). The capacitors were solder-mounted to substrates. In a subsequent acceleration reliability test, a voltage 1.2 times of the rated voltage was applied for 500 hours under a condition of 120° C. In an evaluation that was carried out after the test for each capacitor, the leakage current for seven capacitors of the Comparative Example was 30 $\mu$A or higher, while the leakage current did not exceed 10 $\mu$A for the capacitors of the Examples.

The capacitance of the capacitors in the respective Examples was 135 $\mu$F to 165 $\mu$F after the aging, and these values did not differ remarkably from the standard value (150 $\mu$F). For capacitors in Examples 1–12, capacitance values ranged from 135 $\mu$F to 155 $\mu$F, which were somewhat low. For capacitors in the Examples 13, 14 where nitro group containing compounds were added together and for capacitors in the Example 15 where a nitro group containing compound was included as an organic compound, capacitance as high as 150 $\mu$F to 165 $\mu$F was kept.

As mentioned above, the leakage current was lowered efficiently for the capacitors in the respective Examples. Furthermore, when a compound having a reduction potential equal to or higher than a hydrogen-generating potential, e.g., a nitro group containing compound is added, the obtained capacitor will have a capacitance that is lowered less even if the capacitor is aged to lower the leakage current.

Though these examples relate to molded products, similar effects are obtainable for dipped products. The leakage current would be increased for molded or dipped products especially due to stress caused by resin-setting at forming a package. Therefore, the present invention will be used preferably for these products.

For a product inserted in a case as a package, lowering of the leakage current is preferable. The present invention will be preferable especially, when a capacitor element is completely sealed in a case of ceramic, resin, metal or the like, since repairing under an influence of moisture absorption is difficult for such a capacitor.

Though these examples relate to tantalum solid electrolytic capacitors, similar effects can be obtained for capacitors having anodes of niobium or aluminum. It should be noted that when an amine is included in an aluminum electrolytic capacitor, the capacitor had less leakage current when compared to a capacitor in which any other organic compounds were included. In a comparison of aluminum electrolytic capacitors manufactured under the same condition, the leakage current for capacitors having impregnated glycerol was 10 $\mu$A on average while the leakage current for capacitors having impregnated triethanolamine was 5 $\mu$A or less.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a solid electrolytic capacitor comprising a package and a capacitor element inside the package, the capacitor element comprising a valve action metal, an oxide film layer formed on the surface of the valve action metal, and a solid electrolytic layer formed on the oxide film layer, the method comprising, making the capacitor element containing an organic compound having a boiling point of not lower than 150° C. and a melting point of not higher than 150° C., and arranging the capacitor element containing the organic compound inside the package, wherein the organic compound is an amine.

2. The manufacturing method according to claim 1, wherein the organic compound is included in the capacitor element by impregnating a solution prepared by dissolving the organic compound in a solvent into the capacitor element and evaporating the solvent by heat.

3. The manufacturing method according to claim 1, wherein the organic compound is included in the capacitor element by impregnating a vapor generated by heating the organic compound into the capacitor element.

4. The manufacturing method according to claim 1, wherein the organic compound is included in the capacitor element by impregnating the organic compound that is liquefied by heating into the capacitor element.

5. The manufacturing method according to claim 1, wherein the organic compound is included in the capacitor element by impregnating the organic compound into the capacitor element after lowering the viscosity of the organic compound by heating.

6. The manufacturing method according to claim 1, wherein the organic compound is included in the capacitor element by adding the organic compound to a solution for forming the solid electrolytic layer.

7. The manufacturing method according to claim 1, wherein the capacitor element is made to further contain a substance having a reduction potential that is equal to or higher than a hydrogen-generating potential.

8. The manufacturing method according to claim 1, further comprising applying a dc voltage so as to repair a defect of the oxide film layer.

9. The manufacturing method according to claim 8, wherein a defect of the oxide film layer is repaired by applying a dc voltage while liquefying the organic compound by heat generated due to the applied dc voltage.

10. A method for manufacturing a solid electrolytic capacitor comprising a package and a capacitor element inside the package, the capacitor element comprising a valve action metal, an oxide film layer formed on the surface of the valve action metal, and a solid electrolytic layer formed on the oxide film layer, the method comprising, making the capacitor element containing an organic compound having a boiling point of not lower than 150° C. and a melting point of not higher than 150° C., and arranging the capacitor element containing the organic compound inside the package, wherein the organic compound is a nitro group containing compound having a reduction potential that is equal to or higher than a hydrogen-generating potential.

11. The manufacturing method according to claim 10, wherein the organic compound is included in the capacitor element by impregnating a solution prepared by dissolving the organic compound in a solvent into the capacitor element and evaporating the solvent by heat.

12. The manufacturing method according to claim 10, wherein the organic compound is included in the capacitor element by impregnating a vapor generated by heating the organic compound into the capacitor element.

13. The manufacturing method according to claim 10, wherein the organic compound is included in the capacitor element by impregnating the organic compound that is liquefied by heating into the capacitor element.

14. The manufacturing method according to claim 10, wherein the organic compound is included in the capacitor element by impregnating the organic compound into the capacitor element after lowering the viscosity of the organic compound by heating.

15. The manufacturing method according to claim 10, wherein the organic compound is included in the capacitor element by adding the organic compound to a solution for forming the solid electrolytic layer.

16. The manufacturing method according to claim 10, wherein the capacitor element is made to further contain a substance having a reduction potential that is equal to or higher than a hydrogen-generating potential.

17. The manufacturing method according to claim 10, further comprising applying a dc voltage so as to repair a defect of the oxide film layer.

18. The manufacturing method according to claim 17, wherein a defect of the oxide film layer is repaired by applying a dc voltage while liquefying the organic compound by heat generated due to the applied dc voltage.

* * * * *